United States Patent [19]

Altman et al.

[11] 4,263,042

[45] Apr. 21, 1981

[54] TECHNIQUE FOR TRANSFORMING SODA MATTE SLAG SULFIDES INTO SILICATES

[75] Inventors: Roger L. Altman, East Windsor, N.J.; M. Vikram Rao, Houston, Tex.

[73] Assignee: N. L. Industries, Inc., Hightstown, N.J.

[21] Appl. No.: 92,295

[22] Filed: Nov. 8, 1979

[51] Int. Cl.³ .............................................. C22B 7/04
[52] U.S. Cl. ........................................... 75/24; 75/77
[58] Field of Search ............................ 75/24, 77, 69

[56] References Cited

U.S. PATENT DOCUMENTS 3,849,117  11/1974  Philpotts ................................. 75/24
4,172,715  10/1979  Altman et al. ......................... 75/24

Primary Examiner—M. J. Andrews
Attorney, Agent, or Firm—Gerald K. White; Eugene Striffler, Jr.

[57] ABSTRACT

Soda matte slags are rendered resistant to spontaneous combustion through the addition of silica-bearing fluxes which convert sulfides to silicates.

17 Claims, 2 Drawing Figures

TECHNIQUE FOR TRANSFORMING SODA MATTE SLAG SULFIDES INTO SILICATES

Molten slags generated from the soda matte smelting of lead and antimony bearing materials are conventionally treated for ultimate disposal by pouring the slag into a slag pot, permitting the slag to solidify, and then removing the solidified slag to a land fill area. Such slags may be subject to autoignition, or stated another way, spontaneous combustion, unless costly preventative measures are taken to ensure that the slags do not ignite. As the combustion of these slags could create environmental problems, a technique that ensures that such combustion will not occur is of substantial utility from the stand-points of maintaining existing air and water quality. This invention relates to techniques that have resulted in the avoidance of the spontaneous combustion of soda matte slags.

A technique for rendering soda matte slags resistant to spontaneous combustion is disclosed in copending Patent Application Ser. No. 937,921, filed Aug. 30, 1978, and entitled "Method of Making Soda Matte Slags Resistant to Spontaneous Combustion", now U.S. Pat. No. 4,172,715. This technique involves control of the slag making constituents and the resultant slag composition. In addition, oxygen lancing of the slag may be used to remove or reduce entrained coke in the slag to levels which lead to slags that are resistant to spontaneous combustion. The lancing technique, unlike the technique of this invention, does not involve the use of a silication step to inert the slag.

This invention involves a method for treating a soda matte slag to improve its resistance to spontaneous combustion which comprises adding a silica bearing flux to a sulfide-containing soda matte to react with the sulfides so as to digest a sufficient amount of the sulfides into a silicate phase thereby creating a dense and impervious mass which is highly resistant to spontaneous combustion. The slag may be oxidized prior to or concurrently with the silication step.

Figure 1:
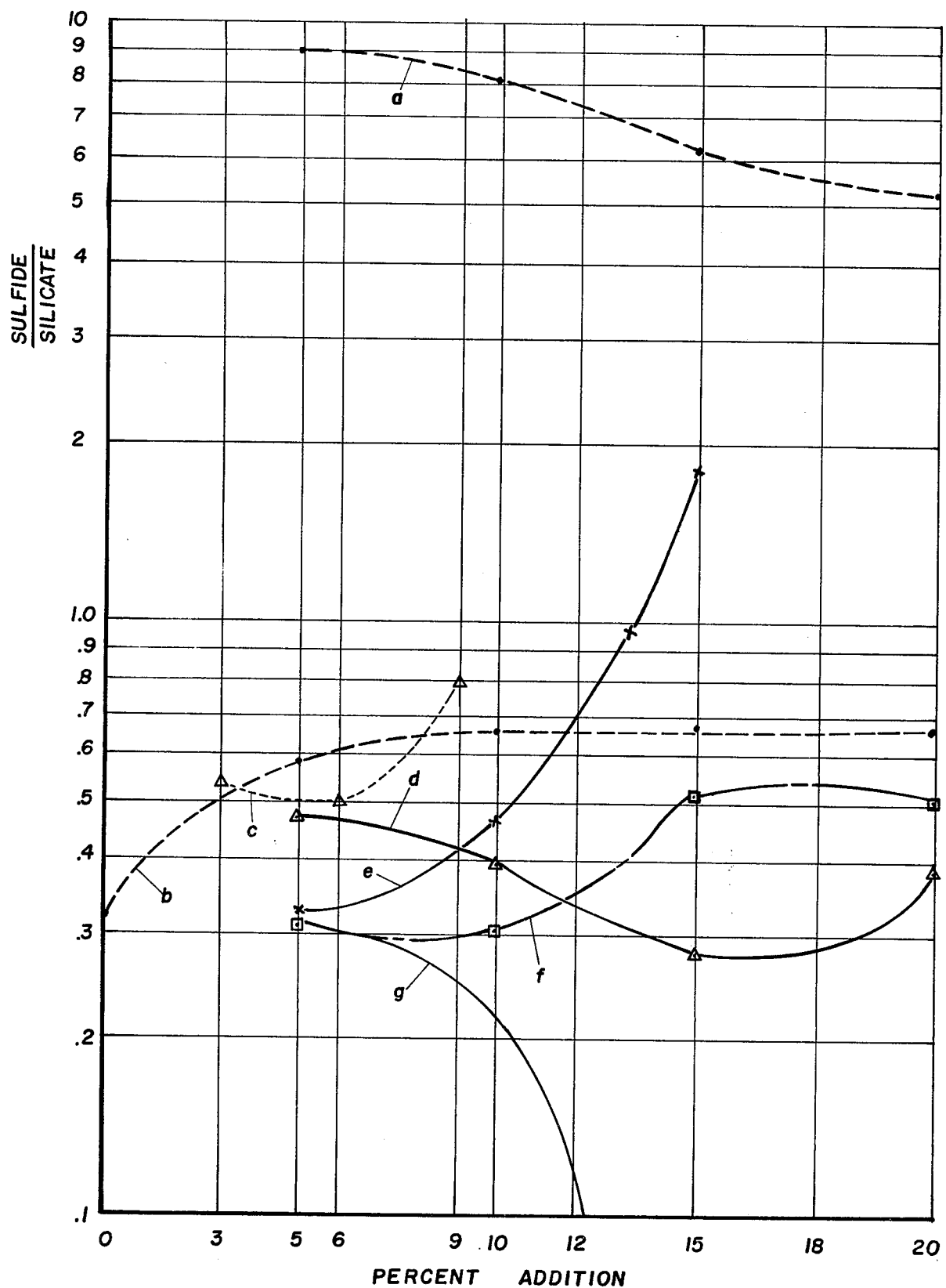
FIG. 1 is a series of graphs that is helpful to illustrate the influence of oxygen lancing and flux additions upon the degree of conversion of sulfide to silicate for soda matte slags.

While not intending to be bound by the following theory, it is presently believed that the autoignition of soda matte slags is related to reactions which occur in the slag following deposition at a disposal site. Due to reaction with carbon dioxide and water vapor from the air, the following reactions are believed to occur:

$$Na_2S + H_2O \rightarrow NaHS + NaOH \quad (1)$$

$$NaOH + Na_2S + CO_2 \rightarrow Na_2CO_3 + NaHS \quad (2)$$

$$Na_2S + 9H_2O \rightarrow Na_2S \cdot 9H_2O \quad (3)$$

$$Na_2CO_3 + 10H_2O \rightarrow Na_2CO_3 \cdot 10H_2O \quad (4)$$

$$NaHS + 2H_2O \rightarrow NaHS \cdot 2H_2O \quad (5)$$

$$Na_2S_2O_3 + 5H_2O \rightarrow Na_2S_2O_3 \cdot 5H_2O \quad (6)$$

Concurrent with reactions (1) through (6), iron sulfide begins to break down upon exposure to water an air as shown in reaction (7):

$$FeS + 3/2 H_2O + 3/4 O_2 \rightarrow FeO(OH) \cdot H_2O + S^\circ \quad (7)$$

The hydrated ferrous oxide is produced in a finely divided form which becomes unstable as the slag dries and produces ferric oxide through spontaneous reaction at ambient temperature.

$$2FeO(OH) \cdot H_2O \rightarrow Fe_2O_3 + 3H_2O \quad (8)$$

The localized heat produced by reaction (8) is sufficient to ignite the elemental sulfur produced from reaction (7) and entrained coke as shown in reactions (9) and (10):

$$S^\circ + O_2 \xrightarrow{165-250^\circ C.} SO_2 \quad (9)$$

$$C + O_2 \xrightarrow{> 250^\circ C.} CO_2 \quad (10)$$

The soda matte slags of the invention are a by-product of various known soda smelting techniques which may be performed in reverberatory and short rotary furnaces as well as in rotary kilns. However, it will be understood by those skilled in the art that the invention is not limited to the treatment of slags produced by such furnaces or processes.

Typical soda smelting processes involve the use of feed materials such as fluxes, a reducing agent, and metal bearing substances. Fluxing materials may include soda ash, iron filings, calcium-containing materials such as limestone, and various silica-containing materials. The reducing agents typically are carbonaceous materials such as charcoal, coke breeze, various peats, coal fines, scrap battery cases, and as well as other organic materials. Metal bearing substances include oxides, sulfates, chlorides, and combinations thereof of lead and/or antimony. Such substances may be in the form of flue dusts, drosses, slimes, residues, etc.

Soda matte slags obtained from the smelting of lead and/or antimony bearing materials to be treated in accordance with the invention typically comprise from about 4% to 50% unreacted carbonaceous material, up to about 35% iron, from about 10% to 35% sulfur, from about 10% to 45% sodium, from about 15% to 45% oxygen, and up to about 10% metal. These slags also may typically contain other ingredients such as silicates from 2% to 15%, carbonates from 2% to 10%, and chlorides from 1% to 10%, as well as other fluxing materials. Sodium is usually contained as sodium sulfide, sodium thiosulfate, sodium chloride, sodium carbonate, sodium oxide, sodium aluminum silicate, sodium calcium silicate and sodium iron silicate. After the slags are deposited in the disposal site they begin to break apart and produce pyroforic species that eventually ignite the unreacted carbonaceous material entrained in the slag.

In accordance with this invention, it has been discovered that the spontaneous combustion of unreacted carbonaceous material such as coke breeze can be essentially eliminated by reacting the slag with a siliceous flux to cause the slag to become inert or highly resistant to spontaneous combustion. The silication of the slag results in a slag that does not break apart upon exposure to the elements and thereby produce pyrophoric species that cause ignition of the carbonaceous material.

The introduction of a silica-bearing flux into molten soda matte slag generally results in the transformation of the sulfide phase into a silicate phase. The physical and chemical properties of the two phases are substantially different. Upon exposure to air and water, the silicates, unlike the sulfides, do not break apart or decrepitate and form pyroforic species and will not combust when heated to 600° C. even though on the order of 20% or more of the slag may contain entrained carbonaceous material.

Various types of fluxes are useful for silicating soda matte slags. FIG. 1 illustrates the influence of oxygen lancing and flux addition upon the degree of conversion of sulfide to silicate (as expressed by the sulfide to silicate ratio.).

A sulfide to silicate ratio of about 3 or less is preferred to achieve an acceptable level of slag inertion.

Various silica-bearing fluxes that are contemplated for use in the invention include sand, clay, sodium silicate, lime glass, a mixture of calcia and silica, as well as mixtures of calcia, silica, and hematite. Such fluxes are generally added in amounts ranging from about 1% to 30% of the initial slag weight. However, the amount to be added is dependent upon the composition of the slag to be treated.

FIG. 1 illustrates the effect of oxygen lancing and flux addition on the degree of conversion of sulfide to silicate (expressed as sulfide to silicate ratio) for soda matte slags of the general composition discussed previously. Curve "a" was derived from trials in which sand flux additions without oxygen lancing were made to the slag. Curve "b" represents results obtained with sand additions and prior oxygen lancing while Curve "c" represents a combination of clay additions with prior oxygen lancing of the slag. Curve "d" illustrates the use of $Fe_2O_3$ additions rather than oxygen blowing in combination with a flux addition mixture of 10% sand and 2.5% lime. Typical lime additions range from about 0.2% to 15% of the initial weight of the slag to be treated. Curves "e", "f", and "g" indicate the results obtained with oxygen lancing followed by addition of lime and sand in ratios of 1, 0.5, and 0.25, respectively.

Silication of the slag may be optionally accomplished with use of an oxygen pretreatment step, or, if desired, oxidation may be performed simultaneously with the silication step. As shown by Curve "a" in FIG. 1, some fluxes such as sand lead to unacceptably high sulfide to silicate ratios unless the slag is lanced initially with oxygen. It has been found (see curve "d" of FIG. 1) that a combination 10% sand and 2.5% CaO is particularly effective in silicating previously oxidized slag. In one experiment, essentially all of the sulfide was converted to the silicate form. However, lancing is not always necessary in order to obtain a significant degree of silication. When iron oxide or other oxides such as MnO, $CaCO_3$, $CaSO_4$, $NaCO_3$, and $NaSO_4$ combinations thereof are used to oxidize the slag instead of oxygen, more than three fourths of the slag is converted to a silicate indicating that the direct addition of oxidizing and silicating agents to the slag pot is a simple and practical alternative for silicating soda matte slag. Such oxidizing agents are typically added in amounts ranging from about 1% to 45% of the initial slag weight.

While not intending to be bound by the following theory, it is presently believed that oxidation of the slag serves to modify the surface of the entrained unreacted carbonaceous particles in the slag so that such particles are wet by the silicate phase. Because the slag itself becomes inert due to silication, a barrier to subsequent oxidation or spontaneous combustion of the particulate carbonaceous material is created.

Figure 2:
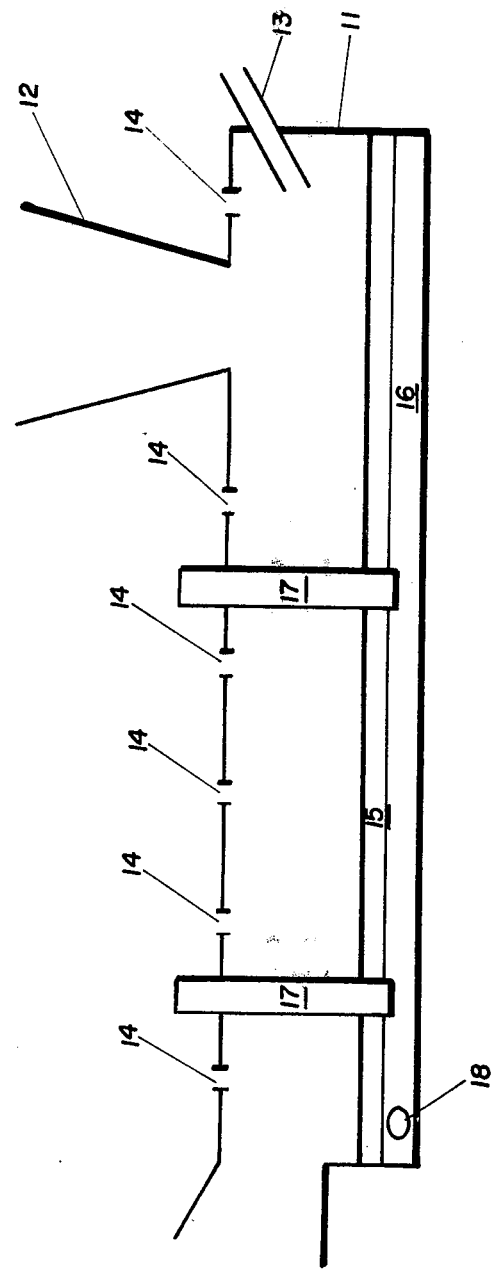
FIG. 2 depicts a reactor vessel that is suitable for conducting the process of the invention.

FIG. 2 illustrates an embodiment of the invention that may be used for the silication of sulfide-containing soda matte slags. Layer 15 of sulfide-containing soda matte slag phase floats on top of layer 16 of reacted slag phase which has been silicated. Incoming matte-slag may be charged into reactor vessel 11 through feed opening 12 and then is collected by layer 15. A silica-bearing flux is added to the vessel through feed openings 14 to be mixed and reacted with layer 15 to produce silicated slag layer 16 almost immediately. Solid particulate oxidizing agents such as $Fe_2O_3$ and the like may be added and mixed with slag layer 15 through feed opening 13 if desired. After vessel 11 is filled, silicate slag layer 16 may be intermittently tapped through tap hole 18 and cast into slag buttons prior to disposal at an appropriate location. Semi-continuous removal of the silicated slag phase permits additional silicates to be generated from the remaining sulfide. Eventually all of the sulfides in the soda matte slag are consumed thereby yielding an inerted silicate slag. Oxygen lances 17 serve to clean the surface and to combust some of the entrained carbonaceous particles of as well as to stir and oxidize slag layer 15 thereby promoting silication.

To efficiently utilize the reaction vessel, a level of at least about 30% silication of the sulfide phase is needed to obtain an inerted slag. Following attainment of the 30% level, the silicated phase is withdrawn and an additional 30% silication is effected. It is preferred to silicate at least about 50% of the sulfide phase for purposes of facilitating material handling and minimizing the frequency of tapping.

A batch process rather than the reactor vessel may be used if metal oxides are used to effect oxidation of the soda matte slag provided that good silication efficiencies are obtainable. In this embodiment of the invention a flux mixture with sufficient silicating power to achieve essentially about at least about 75% silication is preferred.

The following examples serve to further illustrate the principles of the invention.

EXAMPLE 1

Table 1 contains a summary of a set of experiments in which a crucible containing 150 grams of soda matte slag of the general composition described previously was lanced at 1800°–1850° F. with pure oxygen for 40 minutes at a blowing rate of 3 cubic feet per hour. Up to 100% silication was achieved.

EXAMPLE 2

Table 2 provides a summary of an additional set of experiments in which no oxygen lancing was used to prepare the soda matte slag for flux addition. It should be noted that up to 80% silication was achieved when 10% sand, 2.5% CaO flux was mixed with 35% iron oxide.

EXAMPLE 3

The amount of time used for oxygen lancing is important in determining the degree of silication achieved as shown in Table 3. From these results it appears that 50–60 minutes at a blowing rate of about 3 CFH maximizes the degree of silication for 150 grams of slag.

TABLE 1

Silication Using a Silica Lime Flux

| Run | Flux Addition | % Silicate Formed | % Sulfide Residue |
|---|---|---|---|
| 1 | 5% Sand, 1.25% Lime | 77.7 | 22.3 |
| 2 | 10% Sand, 5% Lime | 80.3 | 19.7 |
| 3 | 10% Sand, 2.5% Lime | 100 | 0 |
| 4 | 3% Sodium Silicate | 65 | 35 |
| 5 | 3% Clay | 64.1 | 35.9 |
| 6 | 6% Clay | 65.7 | 34.3 |
| 7 | 9% Clay | 55.6 | 44.4 |
| 8 | 10% Lime Glass | 31.4 | 68.6 |
| 9 | 5% Sand, 2.5% Lime | 75.2 | 24.8 |
| 10 | 5% Sand, 5% Lime | 76.4 | 23.6 |
| 11 | 10% Sand, 5% Lime | 67.9 | 32.1 |
| 12 | 10% Sand, 10% Lime | 65.9 | 34.2 |
| 13 | 15% Sand, 7.5% Lime | 35.3 | 64.7 |
| 14 | 15% Sand, 15% Lime | 66.1 | 33.9 |

TABLE 2

Silication Results When No Oxygen Lancing Is Used As A Pretreatment

| Run | Flux Addition | % Silicate Formed | % Sulfide Residue |
|---|---|---|---|
| 1 | 5% Sand | 10 | 90 |
| 2 | 10% Sand | 11 | 89 |
| 3 | 15% Sand | 14 | 86 |
| 4 | 20% Sand | 16 | 84 |
| 5 | 10% Sand, 2.5% CaO | 52.4 | 47.6 |
| 6 | 10% Sand, 2.5% CaO, $N_2$ Lanced | 71.2 | 28.8 |
| 7 | 10% Sand, 2.5% CaO, 5% CaO, 5% $Fe_2O_3$ | 67.9 | 32.1 |
| 8 | 10% Sand, 2.5% CaO, 10% $Fe_2O_3$ | 71.2 | 28.8 |
| 9 | 10% Sand, 2.5% CaO, 15% $Fe_2O_3$ | 78.0 | 22.0 |
| 10 | 10% Sand, 2.5% CaO, 20% $Fe_2O_3$ | 71.7 | 28.3 |
| 11 | 10% Sand, 2.5% CaO, 27.5% $Fe_2O_3$ | 78.4 | 21.6 |
| 12 | 10% Sand, 2.5% CaO, 35% $Fe_2O_3$ | 79.9 | 20.1 |

TABLE 3

Effect of Blowing Time on Degree of Silication

| Run | Flux Addition | Blow Time @ 3CFG $O_2$ (min) | % Silicate Formed | % Sulfide Formed |
|---|---|---|---|---|
| 1 | 10% Sand, 2.5% Lime | 20 | 74.8 | 25.2 |
| 2 | 10% Sand, 2.5% Lime | 30 | 86.1 | 13.9 |
| 3 | 10% Sand, 2.5% Lime | 40 | 91.5 | 8.5 |
| 4 | 10% Sand, 2.5% Lime | 50 | 95.6 | 4.4 |

We claim:

1. A method for rendering a soda matte slag resistant to spontaneous combustion, comprising: adding a silica-bearing flux to a sulfide-containing soda matte slag to convert a sufficient amount of said sulfide to a silicate so as to render said soda matte slag resistant to spontaneous combustion.

2. The method of claim 1 wherein said method further comprises the step of oxidizing said soda matte slag.

3. The method of claim 2, wherein: said oxidizing step is performed prior to said flux addition step.

4. The method of claim 2, wherein: said oxidizing step is performed concurrently with said flux addition step.

5. The method of claim 1, wherein: said flux is a member selected from the group consisting of sand, calcia, hematite, clay, sodium silicate, lime glass, and admixtures thereof.

6. The method of claim 1, wherein: lime is added to said soda matte slag along with said silicious flux.

7. The method of claim 1, wherein: said soda matte slag comprises from about 4% to 50% unreacted carbonaceous material, up to about 35% iron, about 10% to 35% sulfur, from about 10% to 45% sodium, from about 15% to 45% oxygen.

8. The method of claim 3, wherein: said oxidizing step comprises injecting a stream of oxygen-containing gas into said slag.

9. The method of claim 1, wherein: said flux is added in an amount ranging from about 1% to 30% of contained silicon based upon weight of said slag.

10. The method of claim 9, wherein: lime is added to said soda matte slag in an amount ranging from about 0.2% to 15% based upon the initial weight of said slag.

11. The method of claim 2, wherein: an oxidizing agent comprising a member selected from the group of iron oxide, MnO, $NaCO_3$, $NaSO_4$, $CaSO_4$, $CaCO_3$, and admixtures thereof is added to said soda matte slag.

12. The method of claim 11, wherein: said oxidizing agent comprises particulate iron oxide.

13. The method of claim 11, wherein: said oxidizing agent is added in an amount ranging from about 1% to 45% based upon the initial weight of said slag.

14. The method of claim 1, wherein: the amount of said silicate-bearing flux is sufficient to obtain a sulfide to silicate ratio of no more than about 3.

15. The method of claim 2, wherein: said silicate is removed following conversion of at least about 30% of said sulfides to silicates and the process is resumed.

16. The method of claim 15, wherein: said silicate is removed following conversion of at least 50% of said sulfide to silicates.

17. The method of claim 1, wherein: at least about 75% of said sulfides are converted to said silicates.

* * * * *